(12) United States Patent
Bauerle et al.

(10) Patent No.: US 8,000,855 B2
(45) Date of Patent: Aug. 16, 2011

(54) ACCUMULATED ERROR TIME MONITORING DIAGNOSTIC CONTROL SYSTEM

(75) Inventors: Paul A. Bauerle, Fenton, MI (US); Joseph M. Stempnik, Warren, MI (US); Mingguang Yu, West Bloomfield, MI (US); Mark H. Costin, Bloomfield Township, MI (US)

(73) Assignee: GM Global Technology Operations LLC

( * ) Notice: Subject to any disclaimer, the term of this patent is extended or adjusted under 35 U.S.C. 154(b) by 541 days.

(21) Appl. No.: 12/204,157

(22) Filed: Sep. 4, 2008

(65) Prior Publication Data
US 2009/0327821 A1    Dec. 31, 2009

Related U.S. Application Data

(60) Provisional application No. 61/076,926, filed on Jun. 30, 2008.

(51) Int. Cl.
*G01M 17/00* (2006.01)
*G06F 15/00* (2006.01)

(52) U.S. Cl. ............................. 701/33; 701/34; 700/30

(58) Field of Classification Search ................ 701/1, 30, 701/31, 29, 34, 33, 99, 54; 700/30; 477/107; 123/349
See application file for complete search history.

(56) References Cited

U.S. PATENT DOCUMENTS

| | | | |
|---|---|---|---|
| 5,908,455 A * | 6/1999 | Parvahan | 701/29 |
| 6,609,051 B2 * | 8/2003 | Fiechter et al. | 701/33 |
| 2003/0114965 A1 * | 6/2003 | Fiechter et al. | 701/29 |
| 2005/0090940 A1 * | 4/2005 | Pajakowski et al. | 701/1 |
| 2005/0131595 A1 * | 6/2005 | Luskin et al. | 701/29 |
| 2006/0030993 A1 * | 2/2006 | Goodell et al. | 701/101 |
| 2009/0005216 A1 * | 1/2009 | Whitney et al. | 477/107 |
| 2009/0024263 A1 * | 1/2009 | Simon et al. | 701/22 |
| 2009/0182478 A1 * | 7/2009 | Whitney et al. | 701/93 |

* cited by examiner

*Primary Examiner* — Ronnie Mancho (57) ABSTRACT

A diagnostic system includes N dedicated diagnostic modules that each correspond with a respective one of multiple control systems. The N dedicated diagnostic modules each generate status signals indicating results of respective diagnostic tests. A diagnostic error time monitor determines an accumulated error time value between error events for each of the control systems based on the status signals. The diagnostic error time monitor selectively reports a fault to a respective one of the N dedicated diagnostic modules based on the accumulated error time value.

20 Claims, 7 Drawing Sheets

ACCUMULATED ERROR TIME MONITORING DIAGNOSTIC CONTROL SYSTEM

CROSS-REFERENCE TO RELATED APPLICATIONS

This application claims the benefit of U.S. Provisional Application No. 61/076,926, filed on Jun. 3, 2008. The disclosure of the above application is incorporated herein by reference.

FIELD

The present disclosure relates to diagnostic control systems and more particularly to systems for monitoring and tracking diagnostic events.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Diagnostic systems are used in are used to detect error events via various diagnostic checks. Some diagnostic system checks include comparisons between sensor values, calculation results, control module outputs, etc. Other diagnostic system checks include threshold checks, rate limit checks, and feedback tests. A check may be between a commanded, a desired, or an expected value and a measured value. The diagnostic systems may generate faults based on the diagnostic checks and/or when certain conditions exist. Actions may be performed based on the generated faults. The actions may include the indication of a fault or the performance of a repair to resolve the fault.

Diagnostic systems may perform diagnostic procedures with respect to various sensing, monitoring and control systems. For example only, vehicle sensing, monitoring and control systems may include throttle position sensing, accelerator pedal sensing, engine torque monitoring, driver torque monitoring, etc. Each of the diagnostic procedures has associated software and/or hardware overhead.

SUMMARY

In one embodiment, a diagnostic system is provided and includes N dedicated diagnostic modules that each correspond with a respective one of multiple control systems. The N dedicated diagnostic modules each generate status signals indicating results of respective diagnostic tests. A diagnostic error time monitor determines an accumulated error time value corresponding to time between error events for each of the control systems based on the status signals. The diagnostic error time monitor selectively reports a fault to a respective one of the N dedicated diagnostic modules based on the accumulated error time value.

In other features, a diagnostic method includes generating status signals that indicate results of respective diagnostic tests. The diagnostic tests each correspond with a dedicated diagnostic module and a respective one of multiple control systems. Status signals are transmitted to a diagnostic error time monitor. An accumulated error time value corresponding to time between error events for each of the control systems is determined based on the status signals. A fault is selectively reported to a respective one of the N dedicated diagnostic modules based on the accumulated error time value.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated or group) that are used to execute one or more software or firmware programs, a combinational logic circuit, and/or other suitable components that provide the described functionality. Also, as used herein a software ring, such as a XOYR ring, may refer to a set of instructions that are stored in memory and/or executed by a processor.

Although some of the following embodiments are described primarily with respect to vehicle systems and/or coordinated toque control systems, the embodiments may be applied to other computer and/or diagnostic control systems. The embodiments may be applied, for example, to vehicle systems, aeronautical systems, railway systems, manufacturing systems, computer systems, embedded control systems, etc.

Figure 1:
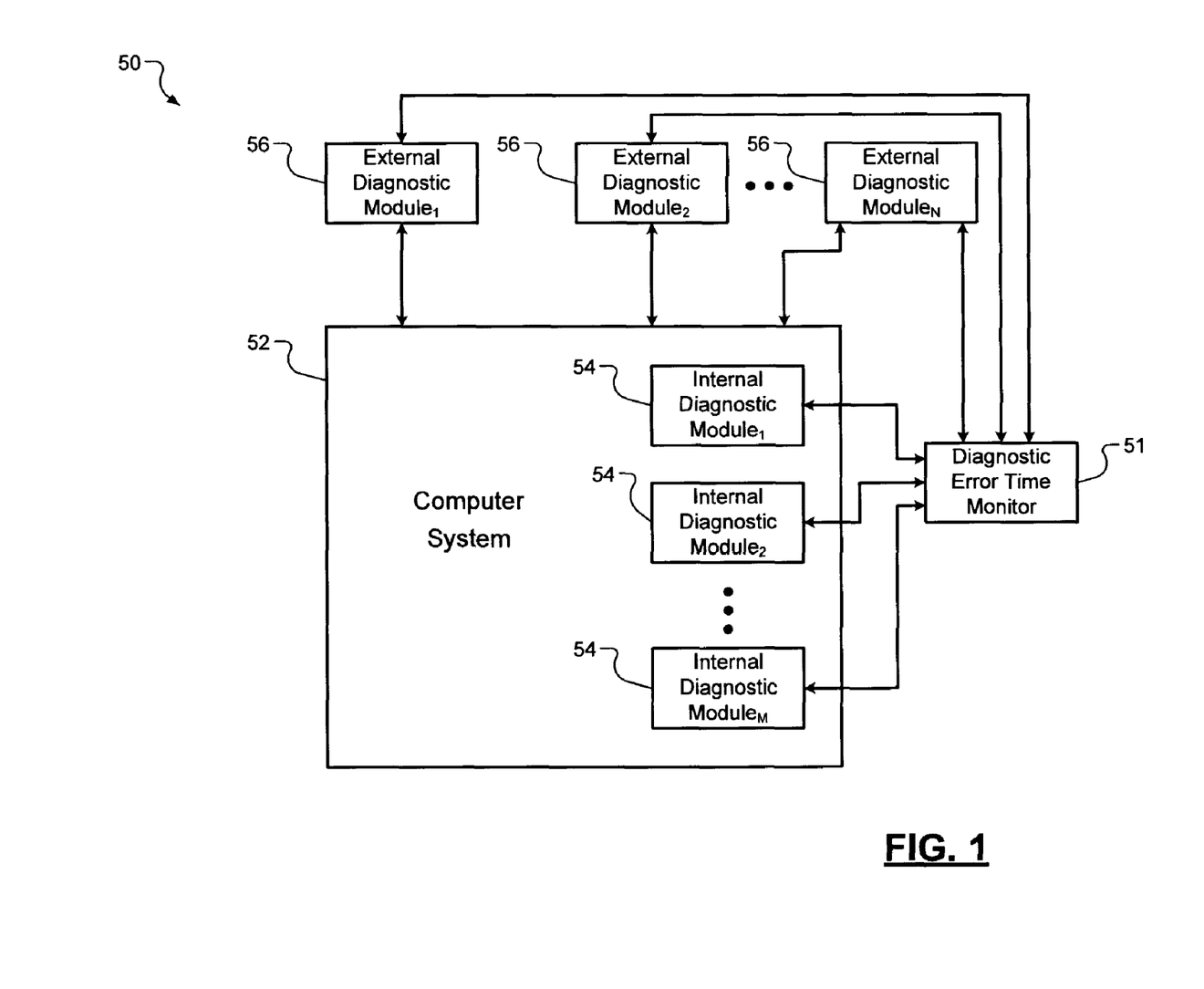
FIG. 1 is a functional block diagram of a diagnostic control system according to the principles of the present disclosure.

Referring now to FIG. 1, a diagnostic control system 50 is shown. The diagnostic control system 50 includes the diagnostic error time monitor 51, a computer system 52 with internal diagnostic modules 54, and external diagnostic modules 56. The diagnostic error time monitor 51 receives status signals from the internal and external diagnostic modules 54, 56 and may also receive status signals from any of the modules of the computer system 52. The diagnostic error time monitor 51 generates accumulated error time values when appropriate based on the status signals. The diagnostic error time monitor 51 generates faults when one or more of the accumulated error time values exceed a corresponding threshold.

Figure 5A:
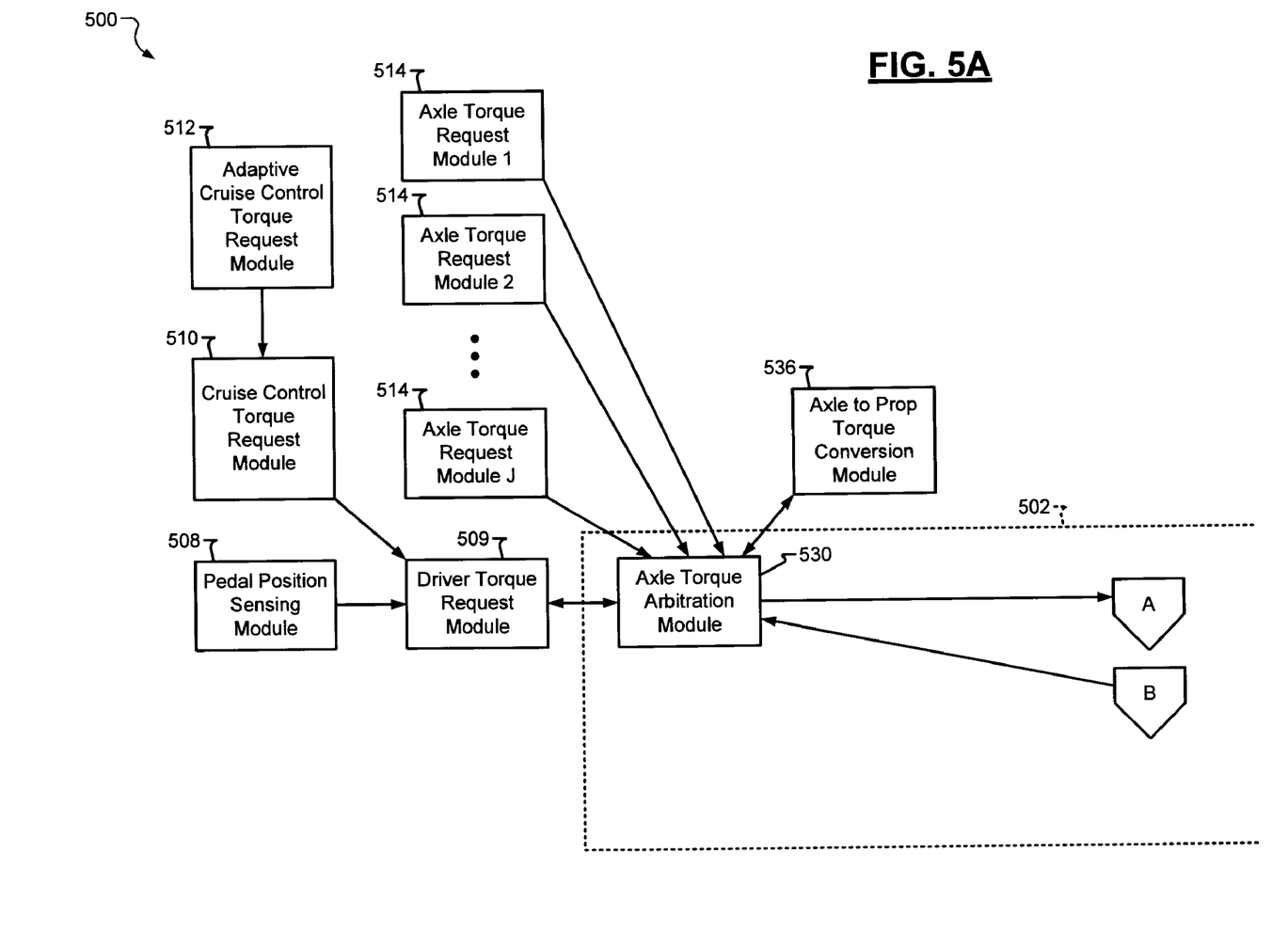
FIG. 5A is a functional block diagram of an exemplary engine control system according to the principles of the present disclosure.
Figure 5B:
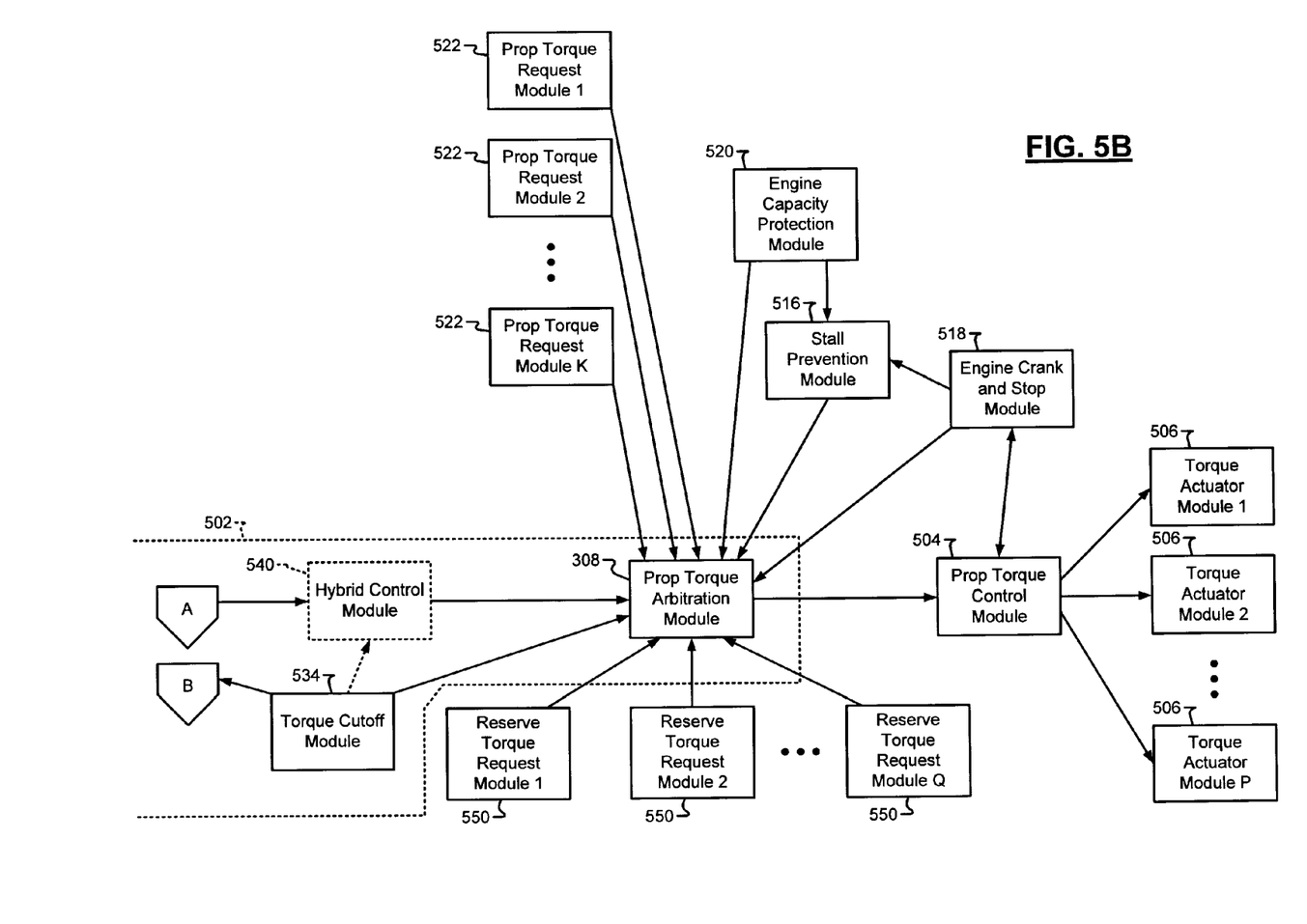
FIG. 5B is a continuation of the functional block diagram of FIG. 5A.

The computer system 51 may include a processor and may be used to monitor various diagnostic modules, control modules, and/or diagnostic modules. One example of a computer system is a coordinated torque control (CTC) processing system. An example of a CTC system is shown in FIGS. 5A and 5B. The embodiments of FIG. 1 are not limited to CTC systems.

The internal and external diagnostic modules 54, 56 may be dedicated to a particular vehicle and/or non-vehicle based control system or may be shared. M internal diagnostic modules are shown and N internal diagnostic modules are shown. For example only, and as applied to a vehicle, the internal and external diagnostic modules 54, 56 may include a throttle position sensing module, an accelerator pedal position sensing module, an engine torque monitoring module, a driver torque monitoring module, etc.

Figure 2:
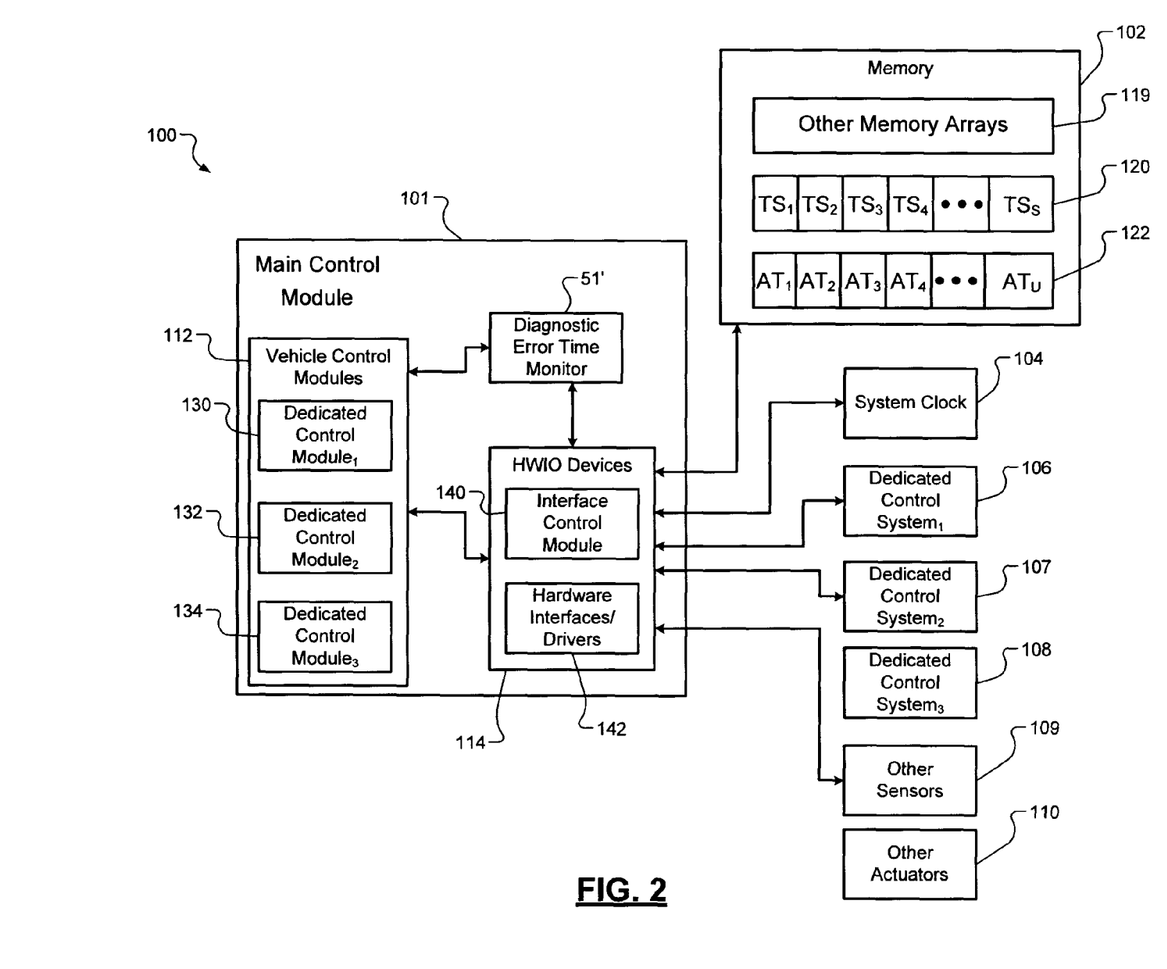
FIG. 2 is a functional block diagram of another diagnostic control system incorporating diagnostic control according to the principles of the present disclosure.

Referring now to FIG. 2, a control system 100 that incorporates diagnostic control is shown. As an example, the control system 100 may be a drivetrain control system. The control system 100 may include a main control module 101, memory 102, a system clock 104, dedicated control systems 106, 107, 108, and other sensors 109 and actuators 110. As applied to a vehicle application, the dedicated control systems may include an ignition control system, a fuel injection control system, an air flow control system, etc. The main control module 101 is in communication with the dedicated control systems 106-108, the other sensors 109 and the other actuators 110.

The main control module 101 may include a diagnostic error time monitor 51', control and diagnostic modules 112 and HWIO devices 114. The control and diagnostic modules 112 may include dedicated control modules 130-134, which may include an ignition control module, a fuel control module, an air control module, etc. For example only, one or more of the control and diagnostic modules may be part of a torque control module. The diagnostic error time monitor 51 is in communication with the control and diagnostic modules 112 directly and in communication with the memory 102 and the system clock 104 via the HWIO devices 114. The diagnostic error time monitor 51 accesses the system clock 104 to generate timestamps of, for example, when status signals are received and/or generated.

The memory 102 may include various arrays, such as an accumulated error count array, a predetermined error time array, a fault status array, a maximum number of sequential errors array, which are designated as memory arrays 119. The memory arrays 119 may have entries that are dedicated to particular control module and/or system and/or to a particular error. The accumulated error count array stores the number of errors detected over a particular period of time for each of the modules and/or systems. The particular period of time may be stored in the predetermined error time array. The predetermined error time array stores time periods in which errors are to be monitored. The fault status array stores faults associated with the control modules and/or systems. The maximum number of sequential errors array stores a maximum number of errors that may be dedicated within a certain period of time for each of the control modules and/or systems.

The memory 102 also includes a timestamp array 120 and an accumulated error time array 122. Other arrays, counters, or time related values may be stored in the memory 102, such as current and previous timestamps, error time between timestamps, etc. The timestamp array 120 includes timestamp values ($TS_1$-$TS_s$) for each of the dedicated diagnostic modules that provides a status signal to the diagnostic error time monitor 51. The variable S is an integer value that may refer to the number of external and internal diagnostic modules that provide status signals. The time stamp values $TS_1$-$TS_s$ are stored in respective array slots and may refer to a current stored timestamp or to a previous stored timestamp.

Timestamps may be stored when the diagnostic error time monitor 51 is invoked by one of the dedicated diagnostic modules. The diagnostic error time monitor 51 may be invoked when one of the dedicated diagnostic modules sends a status signal to the diagnostic error time monitor 51. The status signal may include an error signal or a passed diagnostic test signal. An error may refer to an improper diagnostic test result, an incomplete diagnostic test, an inability to perform a diagnostic test, etc.

The accumulated error time array 122 includes accumulated error time values or counter values $AT_{1-U}$ for each dedicated diagnostic module that has associated accumulated error time value. The accumulated error time values are stored in respective array slots and may be increased, decreased, incremented or decremented based on received status signals. When status signals are received that indicate an error (error status signal), the respective accumulated error time values may be increased or incremented. When the status signals are received that indicate a passed diagnostic test (pass status signal), the respective accumulated error time values may be decreased or decremented.

When the control and diagnostic module is a torque control module and the dedicated control modules 130-134 are, for example, an ignition control module, a fuel control module, and an air control module, the following aspects may hold. The torque control module may include memory with torque related information associated with accelerator pedal positioning, throttle positioning, cruise control information, etc. The ignition control module may include memory with ignition related information associated with ignition timing, advancing or retarding information, number of cylinders enabled for spark, etc.

The fuel control module may include memory with fuel related information associated with fuel enablement for the cylinders of an engine. The fuel related information may include, estimated counts (direct and indirect redundant estimations) of fueled cylinders, an amount of fuel per each enabled/disabled cylinder, durations of fuel injector ON times, a number of cylinders enabled/supplied fuel, and identifications of the enabled/disabled and/or fueled/not fueled cylinders. The air control module may include memory with air flow and/or throttle related information associated with the adjustment of air volumes, pressures, etc. entering an engine.

The HWIO devices 114 include an interface control module 140 and hardware interfaces/drivers 142. The interface control module 140 provides an interface between control and diagnostic software and the hardware interfaces/drivers 142. The hardware interfaces/drivers 142 may control the operation of devices that correspond with each of the dedicated control systems 106-108. For example only, hardware interfaces/drivers 142 may control the operation of fuel injectors, fuel pumps, ignition coils, spark plugs, throttle valves, solenoids and other torque control devices and actuators. The hardware interface/drivers 142 also receive sensor signals, which are communicated to the respective control and diagnostic modules 112.

Figure 3:
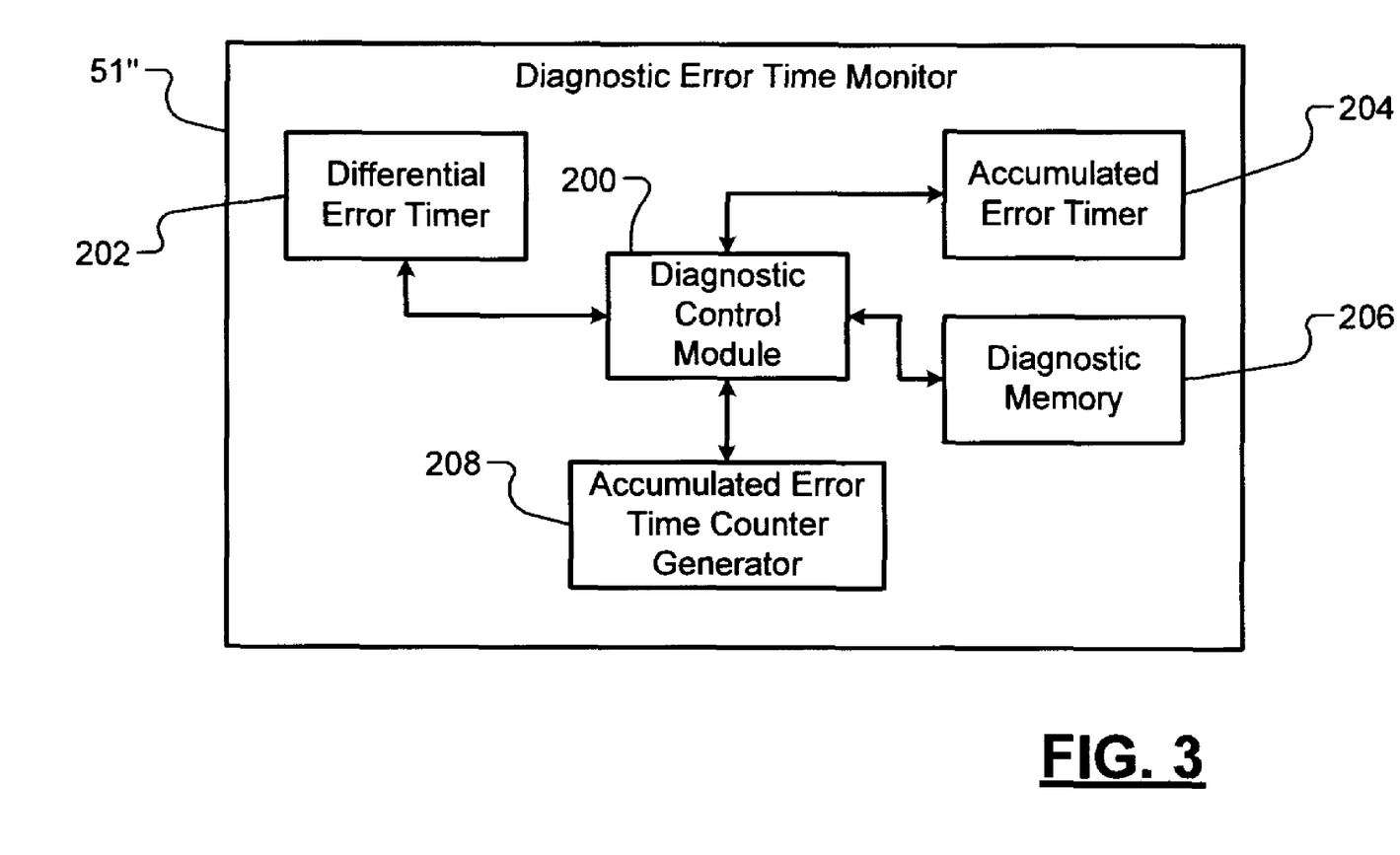
FIG. 3 is a functional block diagram of a diagnostic error time monitor according to the principles of the present disclosure.

Referring now to FIG. 3, a functional block diagram of a diagnostic error time monitor 51'' is shown. The diagnostic error time monitor 51'' includes a diagnostic control module 200, a differential error timer 202, an accumulated error timer 204, diagnostic memory 206, and an accumulated error time counter generator (AETCG) 208. The diagnostic control module 200 is in communication with and may control operation of the differential error timer 202, the accumulated error timer 204, diagnostic memory 206, and the AETCG 208.

The differential error timer 202 may be used to determine the difference between a current timestamp and a previous timestamp. For example, a current timestamp may be generated when the diagnostic error time monitor 51'' is invoked. A time difference, which may be an error time difference or a differential time difference, may be determined by subtracting the previous timestamp from the current timestamp. A differential time difference refers to a time difference between a timestamp associated with a passed test and a timestamp associated with a previous error.

The use of timestamps allows the diagnostic error time monitor 51'' to accurately time the duration of one or more errors. The diagnostic error time monitor 51'' may "mature" the errors into faults when certain conditions exist. The term mature refers to the generation or indication of a fault based on the duration of the error and/or one or more other conditions.

The differential error timer 202 may limit a time difference. As an example, a diagnostic loop may be known to have a predetermined duration. When a time difference is determined to be greater than that predetermined duration, the time difference may be reduced to match the predetermined duration or to match a limiting predetermined or calibration value (first calibration value). To illustrate this point, a diagnostic loop may have, for example, a 25 ms operating duration. The operation of the diagnostic loop may be suspended due to a system interrupt, engine cranking, software initialization, etc., which causes a delay between status signals to be inadvertently increased. This delay could cause an inadvertent fault to be indicated by the diagnostic error time monitor 51''.

Another embodiment includes the triggering of a diagnostic at a variable or fixed rate. For example, when a routine is executed once per combustion or ignition event of an engine, as the engine speed increases, the diagnostic may be executed more frequently. As a result, the time difference decreases. This allows for a fixed time threshold for an error to mature into a fault while allowing more errors to occur at a higher engine speed. The variable rate diagnostic also allows for the change in loop rates. The loop rates may be fixed or vary and may be altered when there is a change in system throughput requirements. As an example, a system may run a diagnostic less frequently and change from a first loop rate (e.g. 12.5 ms) to a second loop rate (e.g. 50 ms) to reduce throughput.

By limiting the time difference, an inadvertent fault indication may be avoided. The limiting calibration value may be shared or the same for multiple dedicated diagnostic modules and may be fixed or variable. In one embodiment, a different limiting calibration value is provided for each of multiple dedicated diagnostic modules. The limiting calibration value may be adjusted based on a change in duration of a dedicated diagnostic test, importance of a dedicated diagnostic test, etc. The limiting also allows for a maximum update to the timer when the error occurs on the first diagnostic test before an accurate value for the previous time stamp is available.

The accumulated error timer 204 may be used to determine accumulated error time values, such as the accumulated error times stored in memory 102 of FIG. 2. When an accumulated error time value is initially generated based on a first reported error, an accumulated error time value is set equal to zero. When another error for the same dedicated diagnostic module is reported, the accumulated error time value is set equal to a previous accumulated error time value plus or minus a current time difference based on an error or pass indication of a status signal.

In one embodiment, when a pass is reported, the current time difference is multiplied by a reducing predetermined or calibration value (second calibration value). Multiplication of the current time difference by the second calibration value generates a decrementing factor. The decrementing factor is subtracted from a previous accumulated error time value to generate a current accumulated error time value. The reducing calibration value may be shared or the same for multiple dedicated diagnostic modules and may be fixed or variable. In one embodiment, a different reducing calibration value is provided for each of multiple dedicated diagnostic modules. The reducing calibration value may be adjusted based on importance of a dedicated diagnostic test.

The diagnostic memory 206 may store current and previous timestamps, error time differences, current and previous accumulated error time values, number of errors, etc. The diagnostic memory 206 may be internal or external to the diagnostic error time monitor 51''.

The diagnostic error time monitor 51'' may be referred to as a XOYR ring (XOYR) module and or perform XOYR techniques. For example, as a backup or in addition to monitoring the accumulated amount of error time, the diagnostic error time monitor 51'' may monitor the number of errors X that are reported within a predetermined time period Y for a dedicated diagnostic module. When the number of errors exceeds a threshold within the predetermined time period, a fault may be reported. The diagnostic error time monitor 51'' may store predetermined time periods for each of the dedicated diagnostic modules. The diagnostic error time monitor 51'' may compare faults generated using the accumulated error time techniques described herein and faults generated using the XOYR technique when determining tasks to be performed as a result of the faults.

Figure 4:
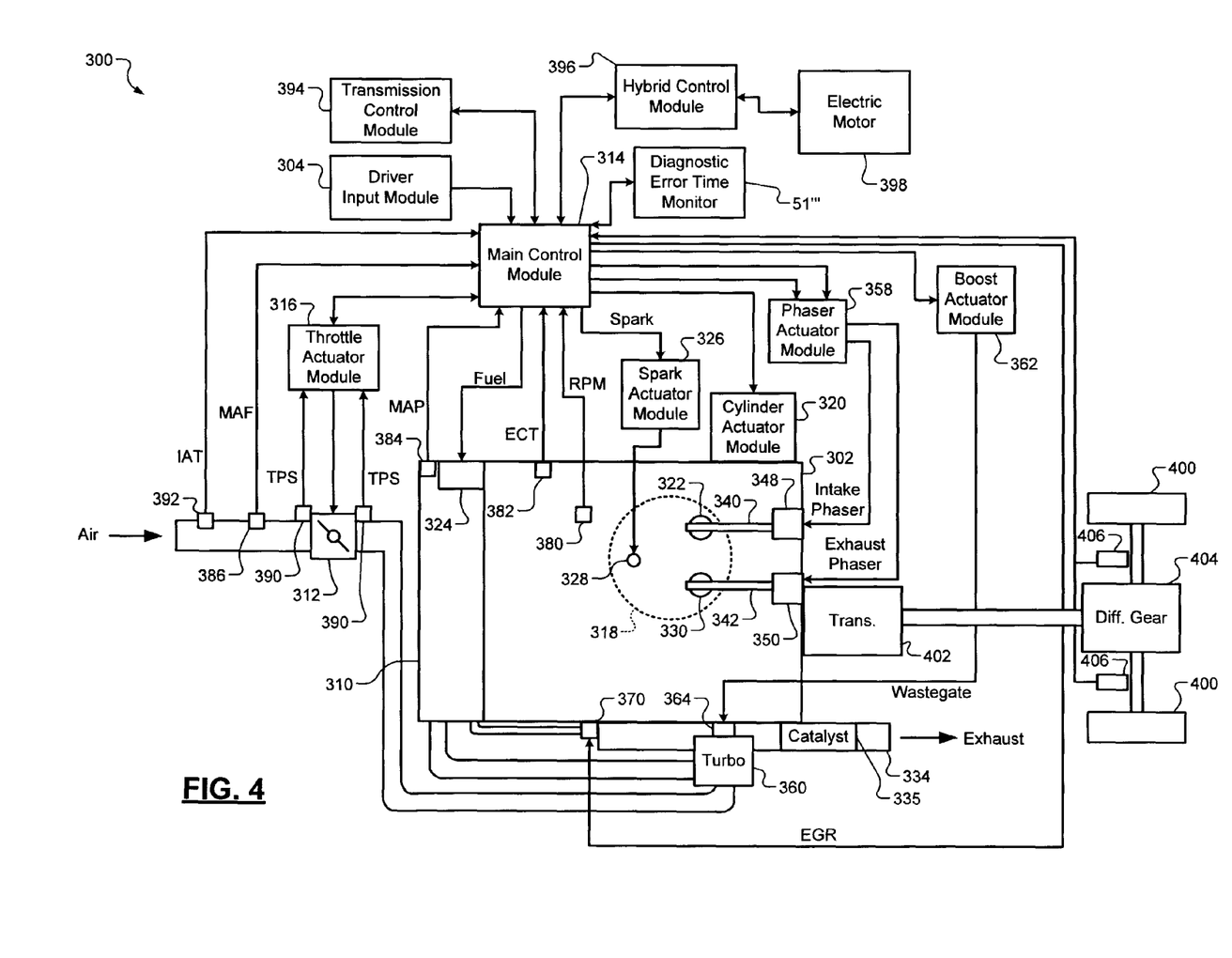
FIG. 4 is a functional block diagram of an exemplary engine system incorporating diagnostic control according to the principles of the present disclosure.

Referring now to FIG. 4, an exemplary engine system 300 is shown. The engine system 300 may be configured for a hybrid electric vehicle. The engine system 300 includes an engine 302 that combusts an air/fuel mixture to produce drive torque for a vehicle based on a driver input module 304. Air is drawn into an intake manifold 310 through a throttle valve 312. A main control module 314 commands a throttle actuator module 316 to regulate opening of the throttle valve 312 to control the amount of air drawn into the intake manifold 310. A diagnostic error time monitor 51''' may be part of or external to the main control module 101' and monitors error time associated with dedicated diagnostic modules of the engine system 300. The diagnostic error time monitor 51''', for example, the time when an error is generated or an error signal is received and the time period between error events. Example diagnostic error time monitors are shown in FIGS. 2-4. Example dedicated diagnostic modules are shown in FIGS. 1, 2, 5A and 5B.

Air from the intake manifold 310 is drawn into cylinders of the engine 302. The engine 302 may include any number of cylinders. The main control module 101' may instruct a cylinder actuator module 320 to selectively deactivate some of the cylinders to improve fuel economy.

Air from the intake manifold 310 is drawn into the cylinder 318 through an intake valve 322. The main control module 101' controls the amount of fuel injected by a fuel injection system 324. The fuel injection system 324 may inject fuel into the intake manifold 310 at a central location or may inject fuel into the intake manifold 310 at multiple locations, such as near the intake valve of each of the cylinders. Alternatively, the fuel injection system 324 may inject fuel directly into the cylinders.

The injected fuel mixes with the air and creates the air/fuel mixture in the cylinder 318. A piston (not shown) within the cylinder 318 compresses the air/fuel mixture. Based upon a signal from the main control module 101', a spark actuator module 326 energizes a spark plug 328 in the cylinder 318, which ignites the air/fuel mixture. The timing of the spark may be specified relative to the time when the piston is at its topmost position, referred to as to top dead center (TDC), the point at which the air/fuel mixture is most compressed.

The combustion of the air/fuel mixture drives the piston down, thereby driving a rotating crankshaft (not shown). The piston then begins moving up again and expels the byproducts of combustion through an exhaust valve 330. The byproducts of combustion are exhausted from the vehicle via an exhaust system 334. Exhaust passes through a catalyst 335.

The intake valve 322 may be controlled by an intake camshaft 340, while the exhaust valve 330 may be controlled by an exhaust camshaft 342. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 320 may deactivate cylinders by halting provision of fuel and spark and/or disabling their exhaust and/or intake valves.

The time at which the intake valve 322 is opened may be varied with respect to piston TDC by an intake cam phasor 348. The time at which the exhaust valve 330 is opened may be varied with respect to piston TDC by an exhaust cam phasor 350. A phasor actuator module 358 controls the intake cam phasor 348 and the exhaust cam phasor 350 based on signals from the main control module 101'.

The engine system 300 may include a boost device that provides pressurized air to the intake manifold 310. For example, FIG. 4 depicts a turbocharger 360. The turbocharger 360 is powered by exhaust gases flowing through the exhaust system 334, and provides a compressed air charge to the intake manifold 310. The turbocharger 360 may compress air before the air reaches the intake manifold 310.

A wastegate 364 may allow exhaust gas to bypass the turbocharger 360, thereby reducing the turbocharger's output (or boost). The main control module 101' controls the turbocharger 360 via a boost actuator module 362. The boost actuator module 362 may modulate the boost of the turbocharger 360 by controlling the position of the wastegate 364. The compressed air charge is provided to the intake manifold 310 by the turbocharger 360. An intercooler (not shown) may dissipate some of the compressed air charge's heat, which is generated when air is compressed and may also be increased by proximity to the exhaust system 334. Alternate engine systems may include a supercharger that provides compressed air to the intake manifold 310 and is driven by the crankshaft.

The engine system 300 may include an exhaust gas recirculation (EGR) valve 370, which selectively redirects exhaust gas back to the intake manifold 310. In various implementations, the EGR valve 370 may be located after the turbocharger 360. The engine system 300 may measure the speed of the crankshaft in revolutions per minute (RPM) using an RPM sensor 380. The temperature of the engine coolant may be measured using an engine coolant temperature (ECT) sensor 382. The ECT sensor 382 may be located within the engine 302 or at other locations where the coolant is circulated, such as a radiator (not shown).

The pressure within the intake manifold 310 may be measured using a manifold absolute pressure (MAP) sensor 384. In various implementations, engine vacuum may be measured, where engine vacuum is the difference between ambient air pressure and the pressure within the intake manifold 310. The mass of air flowing into the intake manifold 310 may be measured using a mass air flow (MAF) sensor 386. In various implementations, the MAF sensor 386 may be located in a housing with the throttle valve 312.

The throttle actuator module 316 may monitor the position of the throttle valve 312 using one or more throttle position sensors (TPS) 390. The ambient temperature of air being drawn into the engine system 300 may be measured using an intake air temperature (IAT) sensor 392. The main control module 101' may use signals from the sensors to make control decisions for the engine system 300.

The main control module 314 may communicate with a transmission control module 394 to coordinate shifting gears in a transmission (not shown). For example, the main control module 314 may reduce torque during a gear shift. The main control module 314 may communicate with a hybrid control module 396 to coordinate operation of the engine 302 and an electric motor 398. The electric motor 398 may also function as a generator, and may be used to produce electrical energy for use by vehicle electrical systems and/or for storage in a battery. In various implementations, the main control module 101', the transmission control module 394, and the hybrid control module 396 may be integrated into one or more modules.

To abstractly refer to the various control mechanisms of the engine 302, each system that varies an engine parameter may be referred to as an actuator. For example, the throttle actuator module 316 can change the blade position, and therefore the opening area, of the throttle valve 312. The throttle actuator module 316 can therefore be referred to as an actuator, and the throttle opening area can be referred to as an actuator position.

Similarly, the spark actuator module 326 can be referred to as an actuator, while the corresponding actuator position is amount of spark advance. Other actuators include the boost actuator module 362, the EGR valve 370, the phasor actuator module 358, the fuel injection system 324, and the cylinder actuator module 320. The term actuator position with respect to these actuators may correspond to boost pressure, EGR valve opening, intake and exhaust cam phasor angles, air/fuel ratio, and number of cylinders activated, respectively.

While electric motor 398 may provide torque in series and/or in parallel with the torque output of engine 302, it should be appreciated that other configurations are also contemplated to be within the scope of this description. For example, electric motor 398 may be implemented as one or more electric motors that provide torque directly to wheels 400 instead of passing through a transmission 402.

The combined torque of engine 302 and electric motor 398 is applied to an input of transmission 402. Transmission 402 may be an automatic transmission that switches gears in accordance with a gear change command from the main control module 101'''. An output shaft of transmission 402 is coupled to an input of a differential gear 404. Differential gear 404 drives axles and wheels 400. Wheel speed sensors 406 generate signals that indicate a rotation speed of their respective wheels 400.

Referring now to FIGS. 5A and 5B, an exemplary engine control system 500 that provides coordinated torque control is shown. The engine control system 500 may be referred to as a CTC system or backbone. Any of the modules of the engine control system 500 may perform a diagnostic test and thus be referred to as a dedicated diagnostic module. FIGS. 5A and 5B join together to depict the complete functional block diagram. A first connector label "A" on FIG. 5A overlays a second connector label "A" on FIG. 5B. A first connector label "B" on FIG. 5A overlays a second connector label "B" on FIG. 5B. FIGS. 5A and 5B are collectively referred to as FIG. 5.

The engine control system 500 employs a torque request backbone module 502 that determines a propulsion torque demand and communicates the propulsion torque demand to a propulsion torque control module 504. Torque request backbone module 502 determines the propulsion torque demand based on inputs from various torque requesting modules 508-522 that are described below in more detail. The torque requesting modules 508-522 include modules that generate signals to affect the control of one or more of actuators $506_{1-P}$ (i.e. actuators 506), which alter engine torque. The propulsion torque demand represents the torque desired from an engine in order to satisfy requests from the torque requesting modules 508-522.

The propulsion torque control module 504 controls one or more of the actuators 506 based on the net propulsion torque demand. Actuators 506 affect the engine torque. Examples of the actuators 506 include: an ignition module that delivers an ignition spark to the engine according to a set ignition timing; a fuel injection module that delivers an appropriate amount of fuel to the engine at a set time; and an electronic throttle control module that adjusts, for example, a throttle valve angle.

Each of the torque requesting modules 508-522 may be categorized as either an axle torque requesting module or a propulsion torque requesting module. Axle torque requesting modules control at least one of vehicle speed and vehicle traction with the road surface. Propulsion torque requesting modules control the output torque of the engine and an electric motor. Example axle torque requesting modules are shown in FIG. 5A and include a pedal position sensing module 508, a driver torque request module 509, a cruise control torque request module 510, an adaptive cruise control torque request control module 512, and other axle toque request modules $514_{1-J}$. Example propulsion torque requesting modules 504 are shown in FIG. 5B and include a stall prevention module 516, an engine crank and stop module 518, an engine capacity protection module 520, and other propulsion torque request modules $522_{1-K}$.

The pedal position sensing module 508 generates a pedal position signal that indicates a vehicle acceleration requested by a vehicle operator. The driver torque request module 509 generates a driver torque request based on the pedal position signal. The driver torque request may also be based on a current engine speed and a current vehicle speed.

The cruise control torque request module 510 generates a cruise control torque request. The cruise control torque request represents an axle torque to maintain the vehicle at a set speed. The adaptive cruise control torque request module 512 may communicate with cruise control torque request module 510 to modify the cruise control torque request based on the environment surrounding the vehicle. For example, adaptive cruise control torque request module 512 may request a reduced axle torque. This request may be to decelerate the vehicle and/or maintain the vehicle at a minimum following distance behind a second vehicle while the cruise control is active.

Other axle torque requesting modules are represented by axle torque request modules $514_1$-j are referred to collectively as axle torque request modules 514. A first example of an axle torque request module 514 is a traction/drag control module. The traction/drag control module determines axle torque changes to control positive wheel slip and negative wheel slip. Positive wheel slip refers to slip between a vehicle tire and a road surface due to excessive powertrain torque during acceleration. Negative wheel slip refers to slip between the vehicle tire and the road surface due to excessive braking axle torque during deceleration. The slip can be detected based on signals from wheel speed sensors.

Another example of an axle torque request module 514 is a vehicle over-speed protection module. The vehicle over-speed protection module determines a maximum axle torque limit to maintain vehicle speed below a predetermined speed limit.

Still another example of an axle torque request module 514 is a brake torque management module. The brake torque management module determines a maximum axle torque when vehicle brakes are applied. The maximum axle torque is the axle torque that can be provided without overcoming the brake torque of the vehicle brakes.

Yet another example of an axle torque request module 514 is a stability control module. The stability control module generates axle torque requests based on a yaw rate of the vehicle. A stability control module may be included in an electronic stability control system.

The torque request backbone module 502 includes an axle torque arbitration module 530 and a propulsion torque arbitration module 532. The axle torque arbitration module 530 receives the various torque requests and/or limits from driver torque request module 509, cruise control torque request module 510, axle torque request modules 514, and a torque cutoff control module 534 (shown in FIG. 5B).

In certain situations propulsion torque is minimized by momentarily turning off fuel and/or spark to an engine. The torque cutoff module 534 may be used to generate the torque requests for these situations, which can include at least one of a clutch fuel cutoff and a deceleration fuel cutoff. A clutch fuel cutoff occurs when the vehicle is equipped with a manual transmission and the vehicle operator disengages the clutch. The clutch fuel cutoff prevents the engine speed from increasing beyond a predetermined speed when the clutch disengages and removes a load from the engine. The deceleration fuel cutoff occurs when the vehicle is coasting above a predetermined speed. The deceleration fuel cutoff helps increase engine braking. Deceleration fuel cutoffs are also communicated to the axle torque arbitration module 530.

The axle torque arbitration module 530 generates a net axle torque request based on the torque requests and/or limits and communicates the net axle torque request to an axle-to-propulsion torque conversion module 536. Axle-to-propulsion torque conversion module 536 converts the net axle torque request to a corresponding propulsion torque request, which may be provided to the propulsion torque arbitration module 532. The conversion may be based on a gear ratio of an axle differential gear, a diameter of a vehicle wheel, a gear ratio of a transmission, and a torque converter gain.

The axle torque arbitration module 530 may be configured for a hybrid electric vehicle. In a hybrid electric vehicle, the total axle torque request from the axle torque arbitration module 530 is communicated to a hybrid control module 540.

The hybrid control module 540 may determine the amounts of propulsion torque to be provided by an electric motor and an engine. The hybrid control module 540 generates propulsion torque requests signals based on the determination, which are provided respectively to the propulsion torque arbitration module 532 and the electric motor. The axle to propulsion torque conversion module 536 may be combined with the hybrid control module 540. Also, the torque cutoff module 534 may communicate deceleration fuel cutoff torque requests to the hybrid control module 540 instead of to the axle torque arbitration module 532.

The propulsion torque arbitration module 532 generates a total requested propulsion torque based on the propulsion torque requests and/or limits from the various propulsion torque request modules, the axle torque arbitration module 530, and/or the hybrid control module 540. The propulsion torque arbitration module 532 communicates the total requested propulsion torque to propulsion torque control module 504. The propulsion torque arbitration module 532 receives propulsion torque requests from the propulsion torque request modules 516-522. The propulsion torque request modules $522_{1-K}$ are referred to collectively as propulsion torque request modules 522.

The stall prevention module 516 determines a minimum torque needed to maintain the engine in a running state. The stall prevention module 516 may increase the minimum torque based on input from the engine crank and stop module 518 and the engine capacity protection module 520.

The engine crank and stop module 518 increases the minimum torque request based on whether the engine is a new or green engine. A green engine refers to an engine that uses a fuel injection pulse width to purge air from a fuel system when the vehicle is first assembled. The engine crank and stop module 518 may also communicate with the propulsion torque arbitration module 504 to retard ignition timing and maintain a constant engine torque despite the increased fuel injector pulse width.

The engine capacity protection module 520 provides a maximum torque limit for an engine based on mechanical limitations of a powertrain. Example mechanical limitations include a maximum torque limit of a transmission and a maximum temperature limit of an exhaust catalyst.

An example of a propulsion torque request module 522 is a transmission torque request module that generates a torque request to reduce engine torque during transmission shifts. Other propulsion torque request modules 522 may include an engine over-speed protection module and an engine idle speed control module. The engine over-speed protection module determines a propulsion torque limit to prevent engine speed from exceeding a predetermined engine speed. The engine idle speed control module determines the propulsion torque needed to maintain an engine at a predetermined idle speed during coasting or at idle with a transmission in a drive or neutral gear.

The propulsion torque arbitration module 532 may also receive reserve torque requests from one or more reserve torque request modules $550_{1-Q}$ are referred to collectively as reserve torque request modules 550. Reserve additional torque that may be provided from an engine. A first example of a reserve torque request module 550 is an air conditioning compressor torque compensation module. The air conditioning compressor torque compensation module requests a reserve torque to maintain a constant engine speed when a compressor clutch engages and disengages.

Another example of a reserve torque request module 550 is a catalyst light-off module. When an engine is started and has a temperature that is less than a certain temperature, the catalyst light-off module requests engine spark to be retarded to increase exhaust gas temperature and heat an exhaust catalyst to a conversion temperature. The catalyst light-off module may also request that a throttle opening be increased while the spark is retarded to compensate for any associated torque loss.

Another example of a reserve torque request module 550 is an intrusive diagnostic module. An intrusive diagnostic module, such as an idle catalyst monitor, may change an air/fuel ratio of an engine to perform a diagnostic test. This change in the air/fuel ratio may alter torque output of an engine. The intrusive diagnostic module may request a reserve torque to compensate for this change in torque output.

Figure 6:
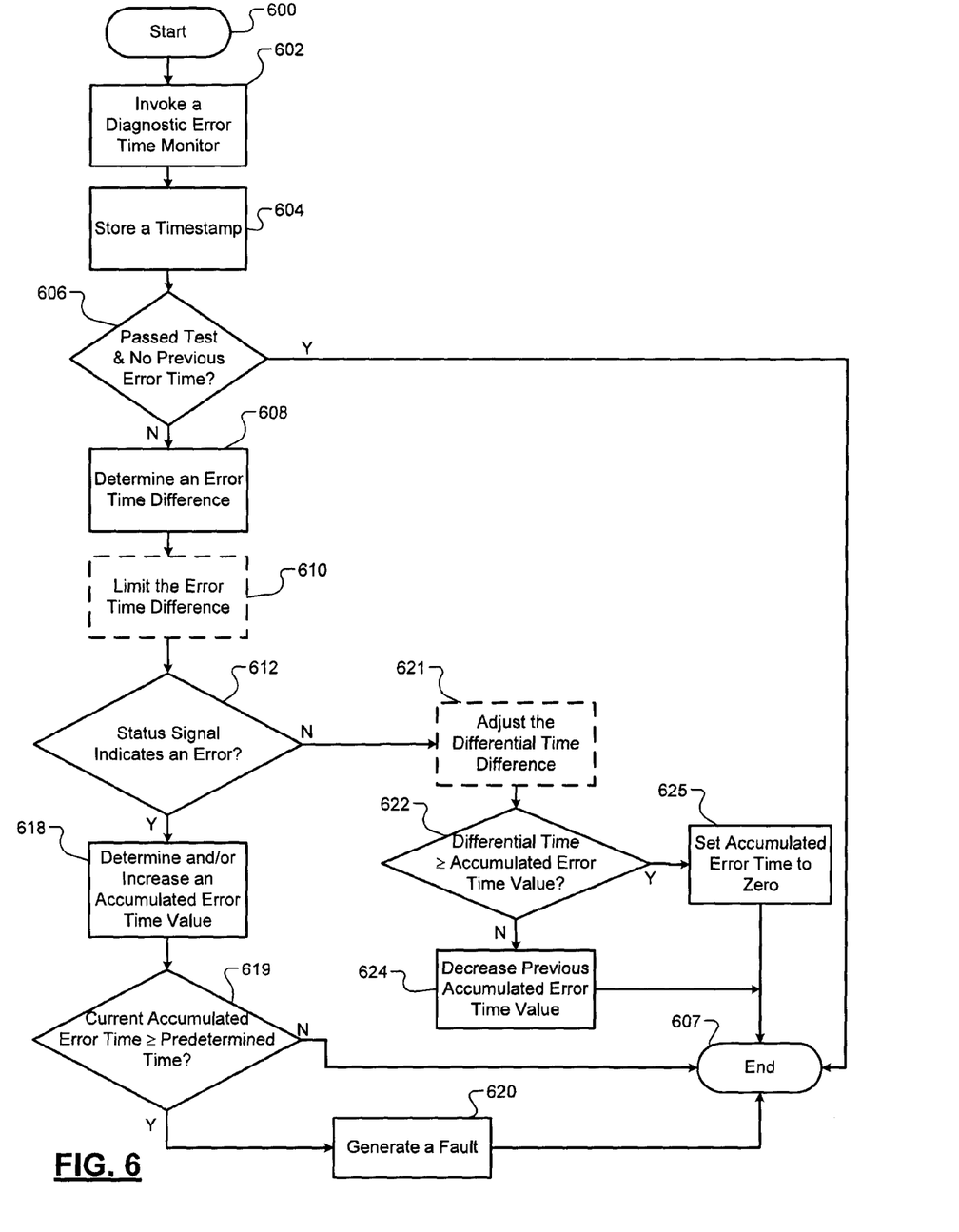
FIG. 6 illustrates a diagnostic control method according to the principles of the present disclosure.

Referring now to FIG. 6, is a logic flow diagram illustrating a diagnostic control method according to the principles of the present disclosure. Although the following steps are primarily described with respect to the embodiments of FIGS. 2-4, the steps may be easily modified to apply to other embodiments of the present invention. The method may be at step 600.

In step 602, a diagnostic error time monitor is invoked by a dedicated diagnostic module, such as one of the diagnostic modules 54, 56.

In step 604, the diagnostic error time monitor stores a timestamp of when a status signal is received by the dedicated diagnostic module. The timestamp may be stored in the timestamp array at an assigned array location.

In step 606, when the status signal indicates a passed test and there is not any previous accumulated error time stored in association with the dedicated diagnostic module, control may proceed to step 607 and end. When the result of step 606 is false, control may proceed to step 608. Step 606 may be performed before step 604, in which case a timestamp array location may be assigned before or upon receiving a status signal that indicates an error for the dedicated diagnostic module. The timestamp location may be assigned before or when a first error for the dedicated diagnostic module is received. An accumulated error time slot may be assigned in any of steps 604-612. This may be done by an AETCG, such as the AETCG 208.

When the status signal indicates an error or when the status signal indicates a passed test and there is previously stored accumulated error time for the dedicated diagnostic module, a differential error timer may determine a time difference. The time difference may be determined according to the following steps.

In step 608, the differential error timer subtracts a previously stored timestamp from the current timestamp (timestamp stored in step 604) to generate an error time difference. An example of a differential error timer is the differential error timer 202. The error time difference may be stored and/or used in the following steps 618, 621 and 622.

In step 610, the error time difference of step 608 may be limited. The error time difference may be limited to a first calibration value, as described above, or to a maximum difference calibration value. When a first error for a dedicated diagnostic module is received (an error occurs for a first diagnostic test), a timer update may be limited to the maximum difference calibration value. As an example, when a diagnostic test is not performed for an extended period time, a timestamp difference may be greater than a maximum timestamp difference value. The timestamp difference is than limited to the maximum timestamp difference value.

As another example, and with respect to a start/stop based engine diagnostic test, when a vehicle is activated and an engine is deactivated, the engine diagnostic test may not be executed for a period of time. Although initial time stamp values may be reset to zero when the vehicle is activated, a timestamp difference corresponding to the engine may include the time that the engine was deactivated and not be representative of an error time duration. To prevent the indication of a false fault, the time stamp difference is limited. This accounts for periods of time when a diagnostic test is not being executed, is interrupted, portions of the diagnostic test are delayed for a period of time, etc. The delayed period of time may be an arbitrary time period and may vary.

In step 612, when the status signal indicates an error, the differential error timer proceeds to step 618, otherwise the differential error timer proceeds to step 621.

In step 618, the accumulated error timer may determine a current accumulated error time value for a corresponding vehicle system. When a second or addition error is received, the current accumulated error time value may be increased. The error time difference of step 608 may be added to a previously stored accumulated error time value to generate the current or updated accumulated error time value. The updated accumulated error time value may be stored and replace the previous accumulated error time value.

In step 619, when the current accumulated error time value is greater than or equal to a predetermined time, control generates a fault in step 620. An example predetermined time is 200 ms. The predetermined time may be fixed and common to the dedicated diagnostic modules of an engine control system or may vary per dedicated diagnostic module. The fault may be reported back to the dedicated diagnostic module. Various tasks or countermeasures may be performed in response to the fault by the diagnostic error time monitor, the dedicated diagnostic module, a main control module, or a vehicle control module. Upon completion of steps 619 and 620, control may return to step 602 or end at 607.

In step 621, the differential time difference may be adjusted. The differential time difference may be multiplied by a second calibration value to generate a decrement factor, as described above.

In step 622, when the differential time difference is greater than or equal to the current accumulated error time value, the diagnostic error time monitor may set to zero the accumulated error time value in step 625 to prevent the accumulated error time from continuing to decrement on a test passed indication. After step 625, control may end at 607 or return to step 602. The diagnostic error time monitor may deassign timestamp and accumulated error time array slots for the dedicated diagnostic module. This releases the array slots for other diagnostic modules.

In step 624, the previously stored accumulated error time value is decreased based on the decrement factor. The decrement factor may be subtracted from the previously stored accumulated error time value to generate a current or updated accumulated error time value. The updated accumulated error time value may be stored in replacement of the previously stored accumulated error time value. After step 624, control may end at 607 or return to step 602.

The above-described steps are meant to be illustrative examples; the steps may be performed sequentially, synchronously, simultaneously, continuously, during overlapping time periods or in a different order depending upon the application.

The embodiments disclosed herein compensate for loop rates of different dedicated diagnostic modules and for varying loop rates of a dedicated diagnostic module. Different dedicated diagnostic modules may have different loop rates, which may be set depending upon the importance of the diagnostic test, whether the diagnostic test is time based or event based, etc.

A dedicated diagnostic module may have a varying loop rate. For example event based diagnostic modules may perform based on a cylinder event, such as a compression event or an intake event of a combustion cycle. The loop rate or how often a diagnostic test is performed increases with engine speed. As an example, a diagnostic test may be performed once every 50 ms when the engine speed is at 600 RPM and once every 5 ms when the engine speed is at 6000 RPM.

By monitoring error time between generated time differences, the embodiments, compensate for the loop rate variability and assure that tasks may be performed within a predetermined time from the generation of a status signal and/or a diagnostic error.

The embodiments are insensitive to diagnostic loop jitter, such as due to interrupts or other diagnostic loop delays. The embodiments provide a robust diagnostic technique and diagnostic monitor that are shared by multiple dedicated diagnostic modules. This can reduce calibration and software maintenance efforts.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A diagnostic system comprising:
   N dedicated diagnostic modules that each correspond with a respective one of a plurality of control systems and that each generate status signals indicating results of respective diagnostic tests, where N is an integer value; and
   a diagnostic error time monitor that determines a first accumulated error time value corresponding to time between error events for each of said plurality of control systems based on said status signals and that selectively reports a fault to a respective one of said N dedicated diagnostic modules based on said first accumulated error time value.

2. The diagnostic system of claim 1 wherein said diagnostic error time monitor comprises:
   a differential error timer that determines a time difference between a current error time and a previous error time for one of said N dedicated diagnostic modules; and
   an accumulated error timer that sums said time difference with said first accumulated error time value of said one of said N dedicated diagnostic modules to generate a second accumulated error time value.

3. The diagnostic system of claim 2 wherein said differential error timer limits said time difference to a predetermined value.

4. The diagnostic system of claim 2 wherein said diagnostic error time monitor indicates said fault when a current accumulated error time value of said accumulated error timer is greater than a predetermined value.

5. The diagnostic system of claim 2 wherein said diagnostic error time monitor multiplies said time difference by a predetermined value to generate a decrementing factor when a status signal of said one of said N dedicated diagnostic modules indicates a passed test, and
   wherein said diagnostic error time monitor decreases a current accumulated error time value of said accumulated error timer and for said one of said N dedicated diagnostic modules based on said decrementing factor.

6. The diagnostic system of claim 1 further comprising memory comprising:

a timestamp array that stores a timestamp for each of said N dedicated diagnostic modules; and accumulated error time counters that correspond with a plurality of said N dedicated diagnostic modules.

7. The diagnostic system of claim 6 wherein said diagnostic error time monitor clears at least one of a timestamp array value of said timestamp array and one of said accumulated error time counters when a status signal indicates a passed test.

8. The diagnostic system of claim 1 wherein said diagnostic error time monitor creates an accumulated error time counter for one of said N dedicated diagnostic modules when a status signal from said one of said N dedicated diagnostic modules indicates an error.

9. The diagnostic system of claim 8 wherein said diagnostic error time monitor increases said accumulated error time counter for each error indication received by said one of said dedicated diagnostic modules.

10. The diagnostic system of claim 8 wherein said diagnostic error time monitor decreases said accumulated error time counter for each pass indication received by said one of said dedicated diagnostic modules.

11. A coordinated torque control system comprising the diagnostic system of claim 1 and further comprising:
an axle torque request module; and
a propulsion torque request module,
wherein said diagnostic error time monitor determines accumulated error time values between error events based on status signals from said axle torque request module and said propulsion torque request module and reports a fault based on said accumulated error time values.

12. A coordinated torque control system comprising the diagnostic system of claim 1 and further comprising:
axle torque request modules that generate respective axle torque requests;
an axle torque arbitration module that generates a net axle torque request based on said axle torque requests;
propulsion torque request modules that generate respective propulsion torque requests;
a propulsion torque arbitration module that determines a net engine torque request based on said net axle torque request and said propulsion torque requests; and
a propulsion torque control module that controls actuators based on said net engine torque request to produce an engine output torque,
wherein said diagnostic error time monitor determines accumulated error time values between error events based on status signals from said axle torque request modules and said propulsion torque request modules and reports a fault based on said accumulated error time values.

13. A diagnostic method comprising:
generating status signals that indicate results of diagnostic tests that each correspond with a respective one of N dedicated diagnostic modules and a respective one of a plurality of control systems;
transmitting said status signals to a diagnostic error time monitor;
determining a first accumulated error time value corresponding to time between error events for each of said plurality of control systems based on said status signals; and
selectively reporting a fault to a respective one of said N dedicated diagnostic modules based on said first accumulated error time value, where N is an integer value.

14. The method of claim 13 further comprising:
determining a time difference between a current error time and a previous error time for one of said N dedicated diagnostic modules; and
summing said time difference with said first accumulated error time value of said one of said N dedicated diagnostic modules to generate a second accumulated error time value.

15. The method of claim 14 further comprising limiting said time difference to a predetermined value.

16. The method of claim 14 further comprising indicating said fault when a current accumulated error time value corresponding to said one of said N dedicated diagnostic modules is greater than a predetermined value.

17. The method of claim 14 further comprising:
multiplying said time difference by a predetermined value to generate a decrementing factor when a status signal of said one of said N dedicated diagnostic modules indicates a passed test; and
decreasing a current accumulated error time value and for said one of said N dedicated diagnostic modules based on said decrementing factor.

18. The method of claim 13 further comprising:
storing a timestamp for each of said N dedicated diagnostic modules in a timestamp array; and
storing accumulated error time values for each of said N dedicated diagnostic modules in an accumulated error time array.

19. The method of claim 18 further comprising clearing at least one of a timestamp array value of said timestamp array and one of said accumulated error time values when a status signal indicates a passed test.

20. The method of claim 13 further comprising:
creating an accumulated error time counter for one of said N dedicated diagnostic modules when a status signal from said one of said N dedicated diagnostic modules indicates an error;
increasing said accumulated error time counter for each error indication received by said one of said dedicated diagnostic modules; and
decreasing said accumulated error time counter for each pass indication received by said one of said N dedicated diagnostic modules.

* * * * *